US009371140B1

(12) United States Patent
Johnson et al.

(10) Patent No.: US 9,371,140 B1
(45) Date of Patent: Jun. 21, 2016

(54) SYSTEM AND METHOD FOR PROVIDING A REAL TIME AUDIBLE MESSAGE TO A PILOT

(71) Applicant: The United States of America as Represented by the Administrator of the National Aeronautics & Space Administration (NASA), Washington, DC (US)

(72) Inventors: Walter W Johnson, Santa Clara, CA (US); Joel B. Lachter, Mountain View, CA (US); Vernol Battiste, San Jose, CA (US); Robert W Koteskey, Danville, CA (US)

(73) Assignee: The United States of America as Represented by the Administrator of the National Aeronautics and Space Administration (NASA), Washington, DC (US)

( * ) Notice: Subject to any disclaimer, the term of this patent is extended or adjusted under 35 U.S.C. 154(b) by 108 days.

(21) Appl. No.: 14/191,246

(22) Filed: Feb. 26, 2014

Related U.S. Application Data

(60) Provisional application No. 61/772,650, filed on Mar. 5, 2013.

(51) Int. Cl.
*G08B 21/00* (2006.01)
*B64D 45/00* (2006.01)

(52) U.S. Cl.
CPC ................................. *B64D 45/00* (2013.01)

(58) Field of Classification Search
None
See application file for complete search history.

(56) References Cited

U.S. PATENT DOCUMENTS

| 6,175,314 | B1 | 1/2001 | Cobley | |
|---|---|---|---|---|
| 2004/0124998 | A1* | 7/2004 | Dame | G08G 5/0013 340/945 |
| 2011/0291861 | A1* | 12/2011 | Meunier | G08G 5/0008 340/945 |
| 2013/0033387 | A1* | 2/2013 | Trope | G01C 23/00 340/971 |

OTHER PUBLICATIONS

Begault, et al., "Applying spatial audio to human interfaces: 25 years of NASA experience," AES 40th International Conference, Oct. 8-10, 2010 (10 pgs), Tokyo, Japan.

Wenzel, "CrewSound: An Auditory Display System for the Study of Advanced Cockpit Communications," NASA Ames Research Center, Moffett Field, CA, Human Systems Integration Division (ARC-TH), Aug. 24, 2009 (14pgs).

* cited by examiner

*Primary Examiner* — Travis Hunnings
(74) *Attorney, Agent, or Firm* — Christopher J. Menke; Robert M. Padilla; John F. Schipper

(57) ABSTRACT

A system and method for providing information to a crew of the aircraft while in-flight. The system includes a module having: a receiver for receiving a message while in-flight; a filter having a set of screening parameters and operative to filter the message based on the set of screening parameters; and a converter for converting the message into an audible message. The message includes a pilot report having at least one of weather information, separation information, congestion information, flight deviation information and destination information. The message is sent to the aircraft by another aircraft or an air traffic controller.

13 Claims, 5 Drawing Sheets

US 9,371,140 B1

SYSTEM AND METHOD FOR PROVIDING A REAL TIME AUDIBLE MESSAGE TO A PILOT

CROSS REFERENCE TO RELATED APPLICATION

This application is a non-provisional of, and claims priority to, U.S. Provisional Patent Application Ser. No. 61/772,650 filed Mar. 5, 2013. The subject matter of the provisional application is hereby incorporated by reference in its entirety.

ORIGIN OF THE INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

FIELD OF THE INVENTION

The present invention relates to a system for cockpit communication, and more particularly a system for providing a pilot with filtered audio messages.

BACKGROUND OF THE INVENTION

The current air traffic control system depends on radio voice communications between pilots and air traffic controllers for safe flight operations. FIG. 1 shows a schematic diagram 100 of a conventional system for managing airspace flight control information. In FIG. 1, only one flight path 110 and three aircraft 102-104 are shown in sector-A for the purpose of brevity, even though there are, in general, multiple flight paths in each sector and multiple aircraft in each flight path. Typically, the pilots of the aircraft 102-104 communicate radio signals 122 with controllers in a control tower 120 to exchange various types of information, such as aircraft movements, aircraft vertical and lateral separation, operation clearances and aviation weather services.

Radio voice communications may present several problems. First, the voice communication between air traffic controllers and pilots operates essentially as a conference call, with the controller and the pilots of the aircraft 102-104 share the same radio channel. This has several consequences. First, pilots flying over the same sector may accidently step on the communication of other pilots or air traffic controllers. As repeated attempts to communicate are made, time is wasted. Second, to establish communication, a radio channel is reserved for a pilot's, say the crew of the aircraft 102, and the air traffic controller's use even when neither is sending the other a message. Thus, there is a saturation point where an air traffic controller cannot handle any additional voice radio communications.

To address these problems, a Controller-Pilot Data Link Communications (CPDLC) system has been introduced. The CPDLC system is designed to replace voice based clearances and readbacks between the pilot and air traffic controller by exchanging messages in an unambiguous digital format between aircraft and controller's computer. When either party's computer receives a message, the computer will display the text of the message for the pilot or air traffic controller to read and acknowledge. Thus, the pilots and controllers can exchange precise information without the problems associated with using radio voice communications.

The CPDLC system uses message sets that include clearance and response message and a numerical code associated with each message that is transmitted between the pilot and controller computer. For instance, the pilot of the aircraft 104 may set a message in the CPDLC system to request the altitude change during the flight path segment 108, to thereby avoid the turbulence 106, to the air traffic controller. In response to the message, the air traffic controller may send an authorization message in the similar digital data format to the flight management computer of the aircraft 104, which in turn converts the message into text message and displays it on a monitor to the pilot.

The existing CPDLC system has three problems. First, the pilots can be inundated with information that the flight management computer provides. This can cause the pilot to waste time isolating and focusing on the information that he/she needs for the task at hand. When the flight requires the pilot to perform many tasks within a short period of time, such as approaching a runway and landing, the time wasted by the pilot can force the pilot to inadvertently miss valuable information or ignore valuable information to keep abreast of the required tasks.

Second, the pilot cannot receive message aurally from the aircraft's CPDLC computer or control the aircraft's CPDLC computer using spoken command because the flight management computer of an aircraft is typically not connected to the cockpit audio system. Spoken commands allow the pilot to use his hands for other tasks in the flight while communicating with the ground controller.

Third, the aircraft pilot would prefer to receive information, such as weather patterns, obstructions and other conditions that may interfere with a flight plan, formal or informal, as the pilot flight proceeds, with a latency of no more than a few minutes. Referring back to FIG. 1, the pilot of aircraft 104 may send a pilot report (PIREP) when the pilot encounters a substantial weather event, such as turbulence 106. The PIREP is received by the air traffic controller at the control tower 120, and may be stored in a database. A pilot of the aircraft 102 may request the PIREP before his own flight begins. If the pilot of the aircraft 102 receives the PIREP containing the information of turbulence 106 before his departure, he would be able to utilize the information to thereby avoid the turbulence 106. However, if the PIREP was received after the pilot started the flight, he would not be aware of the turbulence 106 to take any proper action in advance. In general, a PIREP can be associated with a latency of one to six hours. Thus, learning of, and reacting to, a changing environment within minutes after the change is first observed and reported is not possible with existing PIREP system.

Therefore, there is a need for a system that can provide aural information to pilots in cockpits of aircraft on real time basis, to thereby remove most of the latency associated with PIREP and allows expansion of, and selective filtering of, information that is directly useful to the recipient pilot.

SUMMARY OF THE INVENTION

In embodiments, a method for providing information to an aircraft crew while in-flight includes: providing a set of screening parameters to screen messages; receiving a message while in-flight; filtering the received message based on the set of screening parameters; and presenting the filtered message as an audio message.

In embodiments, a system for providing information to an aircraft crew while in-flight includes: a receiver for receiving a message while in-flight; a filter having a set of screening parameters and operative to filter the message based on the set of screening parameters; and a converter for converting the message into an audible message.

In embodiments, an aircraft includes a module for providing information to a crew of the aircraft while in-flight. The module includes a receiver for receiving a message while in-flight; a filter having a set of screening parameters and operative to filter the message based on the set of screening parameters; and a converter for converting the message into an audible message.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
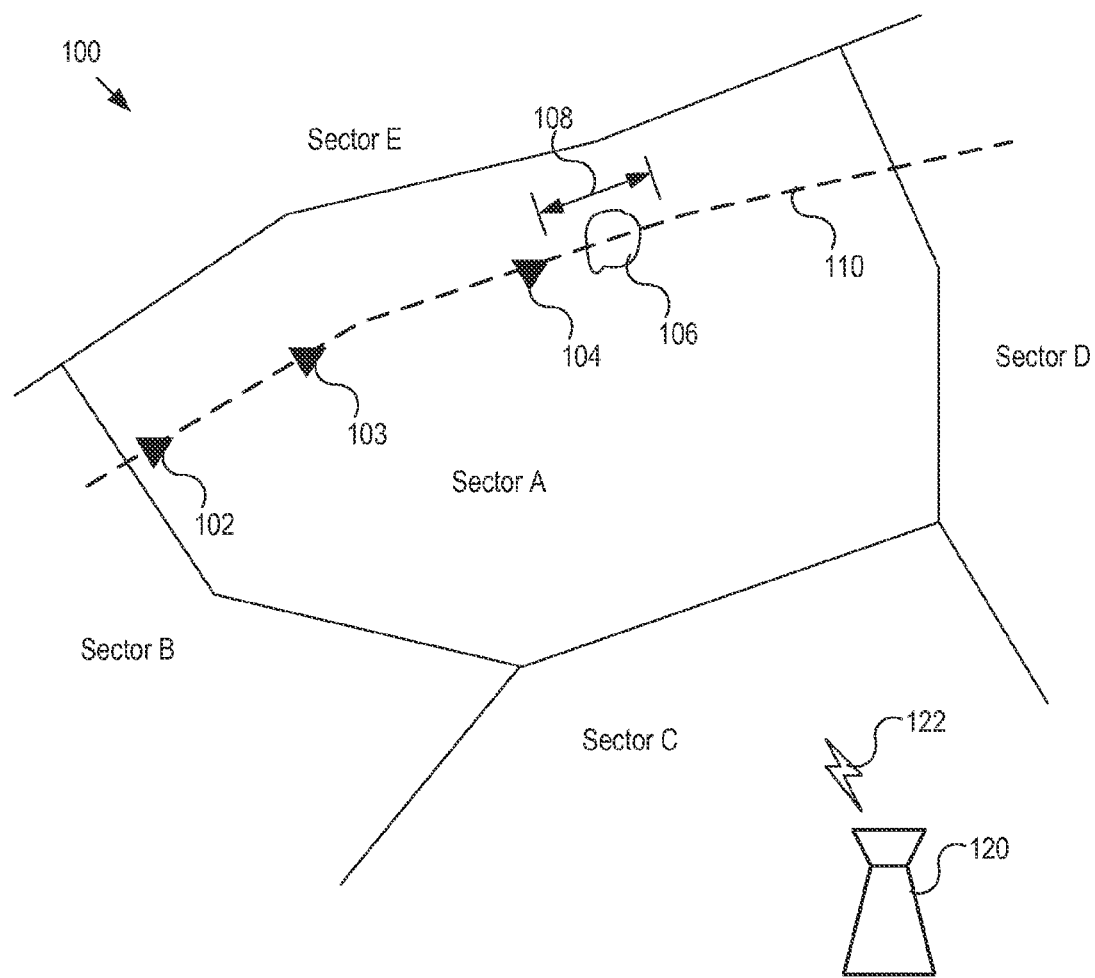
FIG. 1 illustrates a schematic diagram of a conventional system for managing airspace flight control information.

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Also, it shall be noted that steps or operations may be performed in different orders or concurrently, as will be apparent to one of skill in the art. And, in instances, well known process operations have not been described in detail to avoid unnecessarily obscuring the present invention.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules. Components or modules may be implemented in software, hardware, or a combination thereof.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 2:
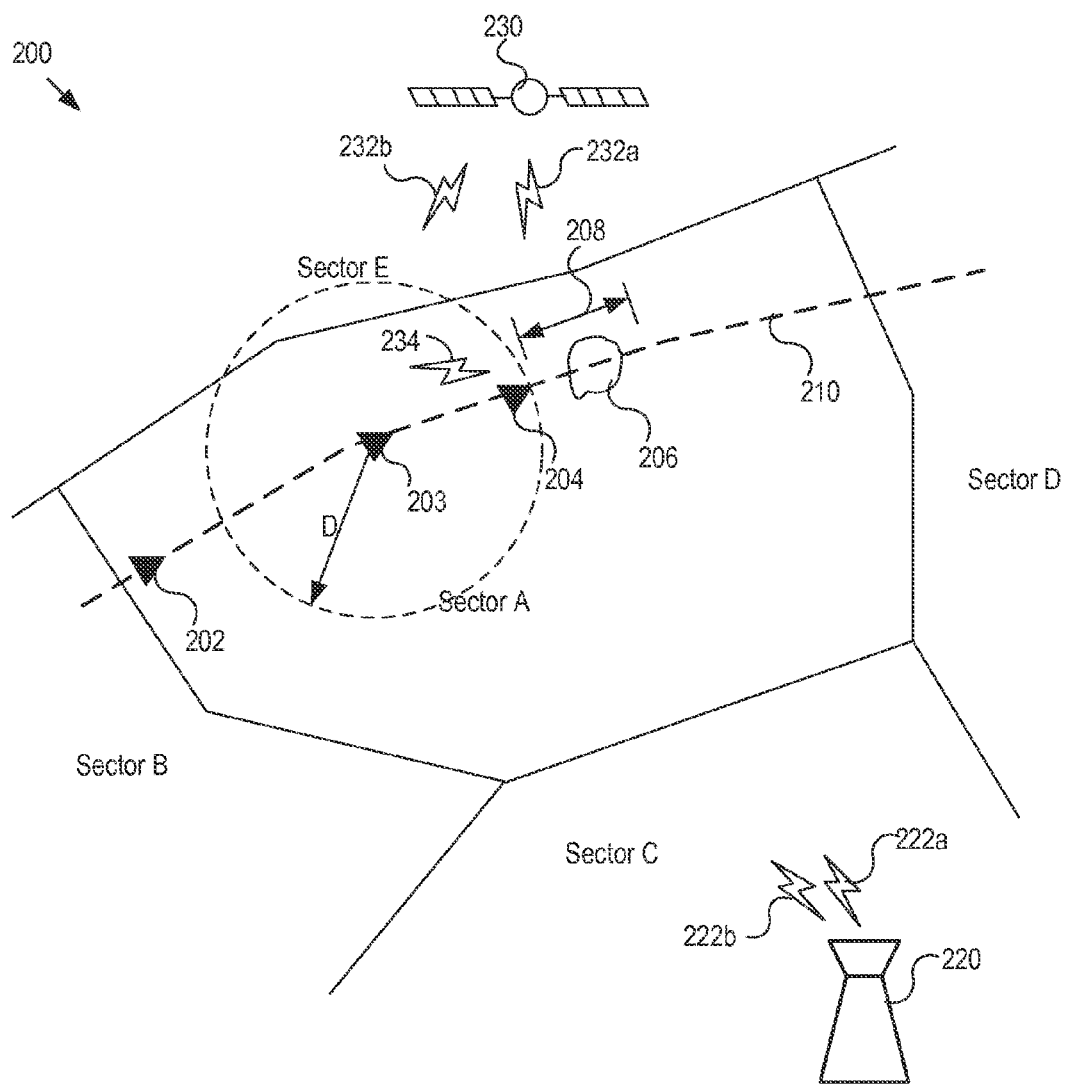
FIG. 2 illustrates a schematic diagram of a system for managing airspace flight control information according to one embodiment of the present invention.

FIG. 2 illustrates a schematic diagram of a system 200 for managing airspace flight control information according to one embodiment of the present invention. As depicted, an aircraft, say 204, encounters turbulence 206 and, in response, the pilot of the aircraft 204 may send communicate signals 222a, 232a, and 234 to the air traffic controller at a control tower 220, a satellite 230, and other aircraft 202 and 203, respectively. For the purpose of illustration, only three communication methods are shown in FIG. 2. However, it should be apparent to those of ordinary skill in the art that other suitable types of communication methods can be also used. Also, FIG. 2 shows how the pilot of the aircraft 204 uses the system 200 to communicate the turbulence and altitude information. However, it should be apparent to those of ordinary skill in the art that the system 200 may be used to communicate information related to other types of events, such as weather information, separation (between aircraft) information, congestion information, flight deviation information and destination information, that the pilot may encounter during the flight along the path 210.

The pilot of the aircraft 204 may send a signal (or, equivalently, message) 222a using its CPDLC system to request altitude change during its flight over the flight path segment 208, to thereby avoid the turbulence 206, to the air traffic controller in the control tower 220. In response to the message, the air traffic controller may send an authorization message 222b in the similar digital data format to the flight management computer of the aircraft 204 and other aircraft 202 and 203. Then, the authorization message is received by a module, or the flight management computer, that is installed in an aircraft, say 203, where the module filters the message and aurally displays the message to the pilot if the message meets the criteria set in advance by the pilot.

Figure 3A:
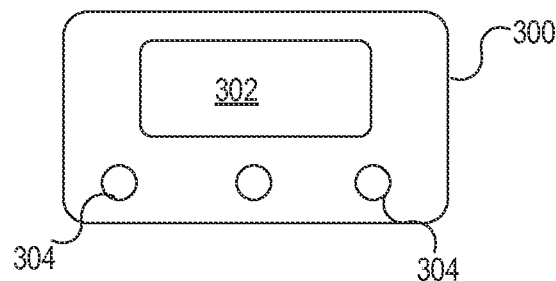
FIG. 3A illustrates a front view of a module for displaying aural message to a pilot according to another embodiment of the present invention.
Figure 3B:
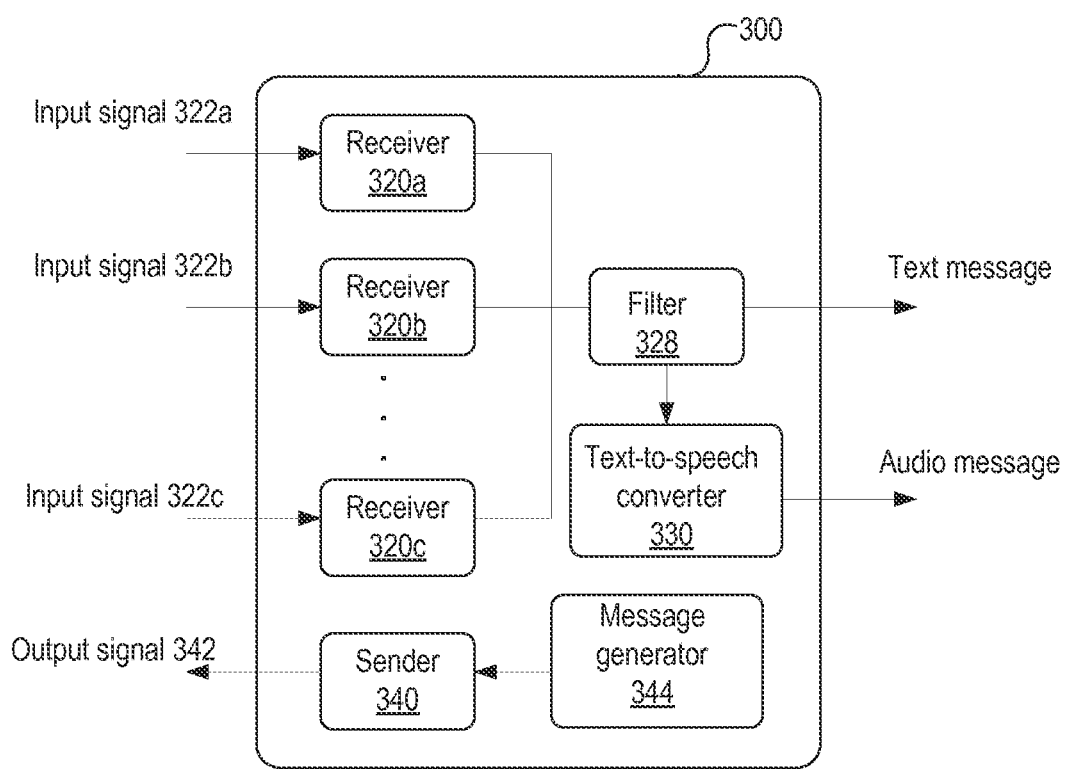
FIG. 3B illustrates an exemplary functional diagram of the module in FIG. 3A.

FIG. 3A illustrates a front view of a module 300 for displaying aural messages to a pilot according to another embodiment of the present invention. FIG. 3B illustrates an exemplary functional diagram of the module 300 in FIG. 3A. As depicted, the module 300 includes a graphic user interface (GUI) 302 and various control knobs/buttons 304 that the pilot can use to manipulate the module 300. For the purpose of illustration, only one GUI and three control knobs are shown in FIGS. 3A and 3B. However, it should be apparent to those of ordinary skill that the module 300 may have other design features and electronic components, depending on the designer's choice. Also, the module 300 may be a stand-alone device or incorporated into other equipment on board of aircraft, such as other signal receiver or audio system or flight management system.

A pilot of the aircraft, say 203, may preset a filter 328 of the module 300 carried in the aircraft 203 to select messages that are directly useful to him. For example, the pilot would control one of the knobs 304 and the GUI 302 to accept the messages associated with aircraft within a selected distance, say D (shown in FIG. 2), from the aircraft 203. Also, by applying a specific set of criteria (or, screening parameters) to the filter 328, the pilot can prevent ignoring important information due to the inundation of other unimportant messages. Also, if the message is verbally displayed, the module 300 mitigates some of the burdens placed on the pilot who has to continuously monitor the flight control panel.

In embodiments, the criteria include target word, target phrase, and distance from the aircraft 203. For example, when the module 300 receives the message 222b as an input signal 322a through the receiver 320a, the filter 328 would accept the message 222b since the message 222b is associated with the aircraft 204 within the distance D from the aircraft 203. The input signal 322a to the module 300 is visually displayed on the GUI 302 and/or aurally displayed to the pilot.

In another embodiment, as shown in FIG. 2, a sender 340 of the module 300 of the aircraft 204 may send an output signal 342, such as a text message 234, directly to the module 300 of the aircraft 203. In yet another embodiment, the module 300 may include a message generator 344 that can generate the message to be transmitted by the sender 340. In still another embodiment, the message generator 344 may be installed outside the module 300.

In embodiments, unlike in the existing system 100 that stores the PIREP from the aircraft 104 in a database and sends the stored PIREP only upon request by the pilot of aircraft 103, the module 300 allows the pilots of aircraft 203 and 204 to communicate with each other directly so that the PIREP information is delivered from in almost real time basis, to thereby reducing the latency of the existing system 100.

The message 234 received by the receiver 320b as an input signal 322b is filtered by the filter 328, and may be visually and/or verbally displayed to the pilot. The message 234 may include various types of information, such as weather patterns, obstructions and other conditions that may interfere with a flight plan, formal or informal, as the pilot flight proceeds, with a latency of no more than a few minutes. Upon receipt of the messages from the module 300, the pilot may determine if any action should be taken by the aircraft 203 in order to avoid, or minimize delay associated with the received information.

In one embodiment, the input signal 322b may be filtered by the filter 328, using a list of N target words and phrases (TWPs), for which the subject is of concern to the pilot of the aircraft 203. The filter 328 can be set to limit the TWP's chosen to TWPs (1) that are originated within a selected distance, say D, from and in a selected sector, say sector A, relative to the aircraft 203; and (2) that are originated/generated within a selected time interval, say within 120 minutes of the present time. Messages containing one or more of the selected TWPs are presented in a selected order (such as, chronological order) as text, or alternatively, as verbal messages for review by the pilot. Upon receipt of the TWPs, the pilot determines if any action should be taken by the aircraft 203 in order to avoid, or minimize delay associated with the TWP information.

Communication between the pilots of the aircraft 203 and 204 within the prescribed range, geographical sector and/or time interval may be implemented using a published and subscribed approach to exchange relevant data. A pilot determines which information he/she is willing to share and with whom (i.e., publish) and from whom the inquiring pilot (i.e., the pilot of aircraft 203) is interested in receiving information (i.e., subscribe). This approach will avoid the radio chatter that often accompanies a party line system. Providing selective filtering of audio and/or text messages, which can be varied according to the present situation, can reduce the information overload to tolerable proportions, especially when the visual system in an aircraft is arguably overloaded. The information received may be audibly displayed, using a text-to-speech converter 330 that does not rely upon visual recognition and response. In embodiments, the converter 330 may include a speaker.

A message received by the aircraft 203 through the module 300 need not originate from another aircraft. For example, a received and filtered message might observe that a preceding flight on roughly the same flight path is deviating substantially from the flight path associated with the filed flight plan (e.g. through abrupt change of altitude or of heading). This intelligence can be made available to the pilot of the aircraft 203 without going through an intermediary explicitly provided by a text or audio message generated by the pilot in the preceding aircraft 204. The intelligence received by the aircraft 203 may be coded or encrypted depending upon the situation and the security concerns. Each such message may be assigned by a priority, with messages having higher priority being given preference in a message queue.

Referring back to FIG. 2, the pilot of the aircraft 204 may send a signal (or, equivalently, message) 232a using its wireless communication system to the satellite 230 and, in response, the satellite 230 may send the same message to other aircraft, say 203. In one embodiment, the wireless communication system may be the Internet that can exchange messages with the aircraft 202-204. Subsequently, the receiver 320c receives the message as an input signal 322c and sends the received signal to the filter 328. The pilot may preset the filter 328 of the module 300 to select messages that are directly useful to him/her. In FIG. 3B, only one filter is shown for brevity. However, it should be apparent to those of ordinary skill in the art that other suitable number of filters may be installed in the module 300 and the filters may screen/filter different types of messages.

Figure 4:
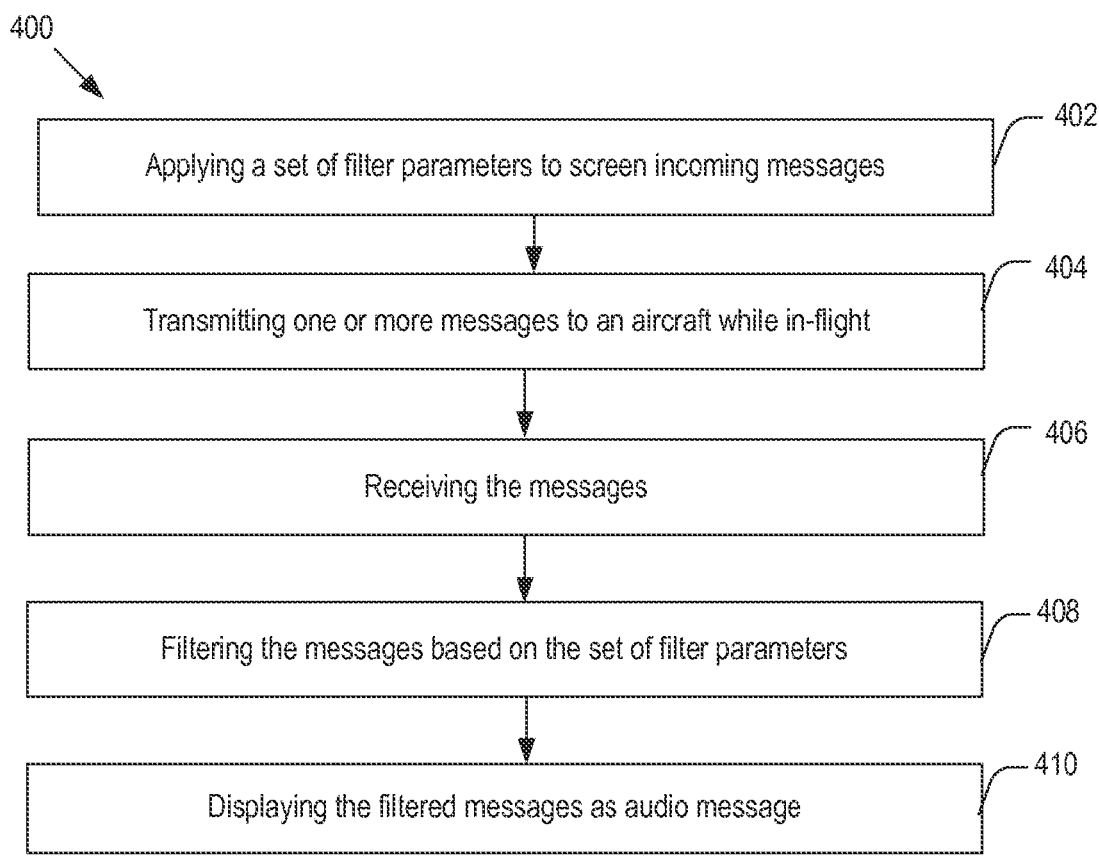
FIG. 4 is a flowchart of an illustrative process for providing aural messages to a pilot during flight according to another embodiment of the present invention.

FIG. 4 is a flowchart of an illustrative process 400 for providing aural messages to a pilot during flight according to another embodiment of the present invention. In step 402, a pilot of an aircraft may apply a set of filter parameters to the module 300, to thereby screen incoming messages. Then, in step 404, one or more messages, such as 222a, 232a, and 234, are transmitted to the aircraft, more specifically, to the module 300 while the aircraft is in-flight. Next, in steps 406 and 408, the module 300 receives the messages and filters the messages based on the set of filter parameters. Subsequently, the filtered messages are aurally displayed to the pilot in step 410.

It will be appreciated by those of the ordinary skill that the illustrated process 400 may be modified in a variety of ways without departing from the spirit and scope of the present invention. For example, various portions of the process 400 may be combined, be rearranged in an alternate sequence, be removed, and the like. In addition, it should be noted that the process 400 may be performed in a variety of ways, such as by software executing in a general-purpose computer, by firmware and/or computer readable medium executed by a microprocessor, by dedicated hardware, and the like.

Figure 5:
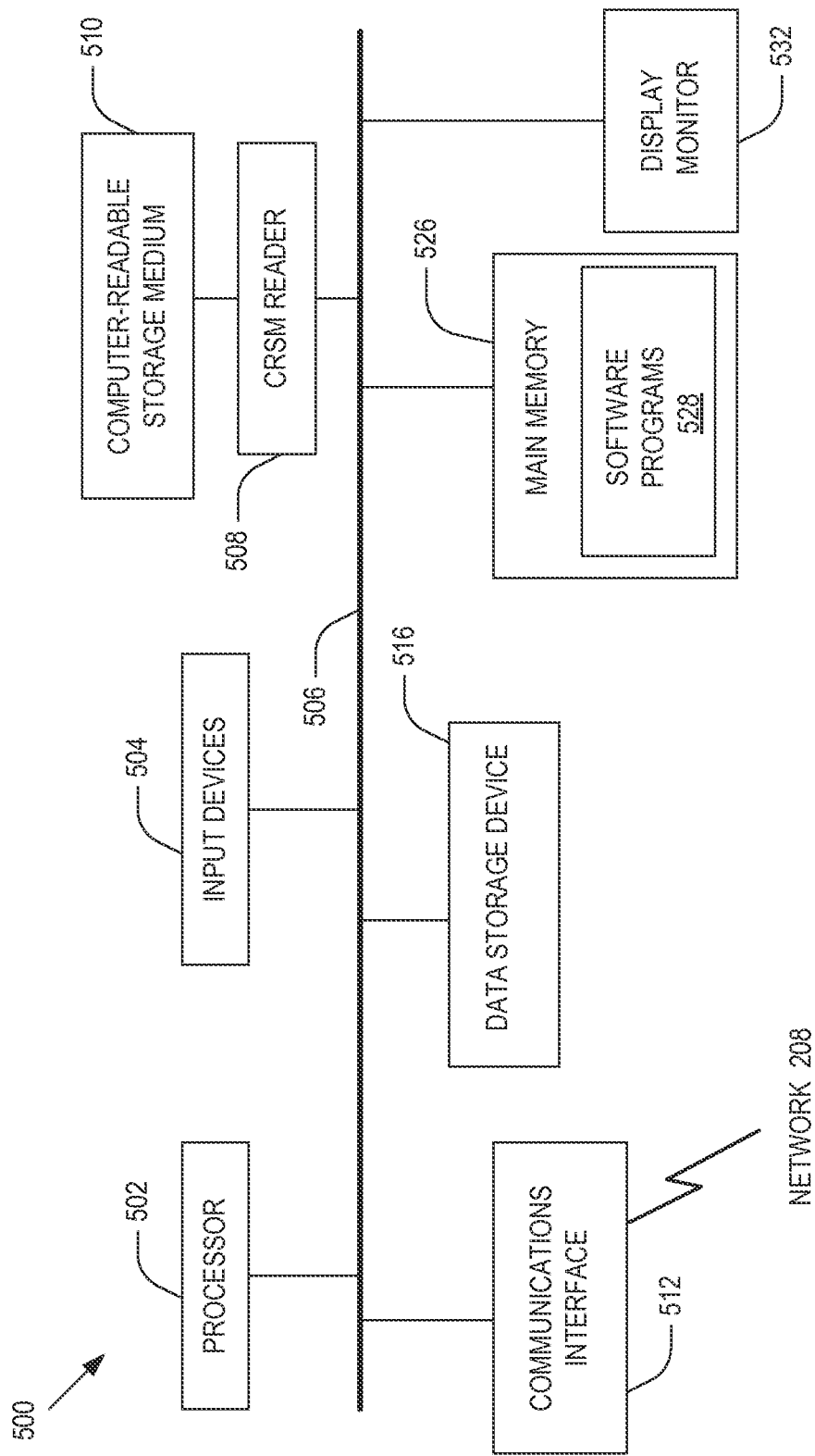
FIG. 5 is a schematic diagram of a typical computer system that may be employed in accordance with the present invention.

FIG. 5 is a schematic diagram of a typical computer system 500 that may be employed in accordance with the present invention. Depending on its configuration, the computer system may be employed as a desktop computer, a server computer, or an appliance, for example and may have less or more components to meet the needs of a particular application. As illustrated, the computer system may include a processor 502, such as those from the Intel Corporation or Advanced Micro Devices, for example. The computer system may have one or more buses 506 coupling its various components. The computer system may also include one or more input devices 504 (such as, keyboard, mouse, or knobs 304), a computer-readable storage medium (CRSM) 510, a CRSM reader 508 (e.g., floppy drive, CD-ROM or DVD drive), a display monitor 532 (e.g., cathode ray tube, flat panel display, or GUI 302), a communication interface 512 (e.g., network adapter, modem, or receivers 320a-320c) for coupling to a network, one or more data storage devices 516 (e.g., hard disk drive, optical drive, FLASH memory), and a main memory 526 (e.g., RAM). Software programs 528, such as filter 328 and text-to-speech converter 330, may be stored in the computer-readable storage medium 510 and read into the data storage devices 516 or main memory 526 as illustrated in FIG. 5.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for providing an audio message to an aircraft crew while in-flight by use of a computer installed in the aircraft, comprising:

providing a set of screening parameters to screen messages, the screening parameters including at least one of target word and target phrase;

receiving a text message while in-flight via a communication interface of the computer;

filtering the received text message based on the set of screening parameters to select a message that includes at least one of the target word and target phrase; and presenting the selected message as an audio message.

2. A method as recited in claim 1, wherein the received text message includes a pilot report having at least one of weather information, separation information, congestion information, flight deviation information and destination information.

3. A method as recited in claim 1, wherein the received text message is transmitted by an aircraft controller or another aircraft.

4. A method as recited in claim 1, wherein the set of screening parameters further includes a time difference between generation and receipt of the text message.

5. A method as recited in claim 1, further comprising:

displaying the received text message on a visual display.

6. A system for providing an audio message to an aircraft crew while in-flight, the system comprising:

a receiver for receiving a text message while in-flight;

a filter having a set of screening parameters that include at least one of target word and target phrase and operative to filter the text message based on the set of screening parameters to select a message that has at least one of the target word and target phrase; and a converter for converting the message into an audible message.

7. A system as recited in claim 6, wherein the converter is configured to present the audible message.

8. A system as recited in claim 6, wherein the text message includes a pilot report having at least one of weather information, separation information, congestion information, flight deviation information and destination information.

9. A system as recited in claim 6, wherein the text message is transmitted by an aircraft controller or another aircraft.

10. A system as recited in claim 6, wherein the set of screening parameters further includes a time difference between generation and receipt of the text message.

11. A system as recited in claim 6, further comprising:

a display panel for visually displaying the text message.

12. A system as recited in claim 6, further comprising:

a sender for transmitting the text message.

13. A system as recited in claim 6, further comprising:

a message generator for generating the text message.

\* \* \* \* \*